(12) United States Patent
Dzikowicz

(10) Patent No.: US 7,041,746 B2
(45) Date of Patent: May 9, 2006

(54) ACCELERATOR SYSTEM FOR SYNTHETIC POLYISOPRENE LATEX

(75) Inventor: Robert Thomas Dzikowicz, Monroe, CT (US)

(73) Assignee: R.T. Vanderbilt Company, Inc., Norwalk, CT (US)

( * ) Notice: Subject to any disclaimer, the term of this patent is extended or adjusted under 35 U.S.C. 154(b) by 27 days.

(21) Appl. No.: 10/743,210

(22) Filed: Dec. 22, 2003

(65) Prior Publication Data

US 2005/0065249 A1   Mar. 24, 2005

Related U.S. Application Data

(60) Provisional application No. 60/505,510, filed on Sep. 24, 2003.

(51) Int. Cl.
*C08F 36/08*   (2006.01)
*C08K 5/39*    (2006.01)
*C08K 5/405*   (2006.01)
*C08K 5/47*    (2006.01)

(52) U.S. Cl. .................. 525/333.1; 525/332.6; 525/332.7; 524/571; 524/201; 524/202; 524/203; 524/211; 524/216

(58) Field of Classification Search ........ 524/572, 524/201, 202, 203, 211, 216, 892; 2/162.7; 525/333.1, 332.6, 332.7
See application file for complete search history.

(56) References Cited

U.S. PATENT DOCUMENTS 5,466,757 A * 11/1995 Watanabe et al. ......... 525/352
5,594,073 A * 1/1997 Crepeau et al. .......... 525/331.8
6,618,861 B1 * 9/2003 Saks et al. ................ 2/161.7
6,828,387 B1 * 12/2004 Wang et al. ............. 525/329.3
2002/0173563 A1   11/2002 Wang et al. ................ 524/25

FOREIGN PATENT DOCUMENTS

GB   1185896   *   7/1968
GB   1185896       3/1970
JP   55-144037 A   *   11/1980

OTHER PUBLICATIONS

JP 55-144037 (English translation).*
*Neoprene Latex*, E.I. duPont deNemours & Co., Inc., 1962, J. Carl.
*Polychloroprene Latexes*, The Vanderbilt Latex Handbook, Third Edition, R. T. Vanderbilt Company, Inc. 1987, J. Fitch.
*Structural Characterization of Vulcanizates. Part III. The cis-1,4-Polyisoprene Tetramethylthiuram Disulfide-Zinc Oxide System*, Journal of Applied Polymer Science, vol. 8, pp. 581-602 (1964), C.G. Moore and A.A. Watson.

* cited by examiner

*Primary Examiner*—Ling-Sui Choi
*Assistant Examiner*—Rip A Lee
(74) *Attorney, Agent, or Firm*—Norris, McLaughlin & Marcus

(57) ABSTRACT

The invention pertains to an accelerator system, such as an accelerator system for synthetic polyisoprene latex. The accelerator system comprises dithiocarbamate and thiourea and can produce synthetic polyisoprene films having a tensile strength of about 3,000 psi to about 5,000 psi at low curing temperatures. The invention also pertains to a method for curing synthetic polyisoprene latex.

18 Claims, No Drawings

ACCELERATOR SYSTEM FOR SYNTHETIC POLYISOPRENE LATEX

CROSS REFERENCE TO RELATED APPLICATIONS

This application claims the benefit of U.S. Provisional Application No. 60/505,510 filed Sep. 24, 2003.

BACKGROUND OF THE INVENTION

1. Field of Invention

The invention pertains to an accelerator system, such as an accelerator system particularly suited for synthetic polyisoprene latex. The accelerator system comprises dithiocarbamate and thiourea. The accelerator system can, for example, produce synthetic polyisoprene films having a tensile strength of about 3,000 pounds per square inch ("psi") to about 5,000 psi at low curing temperatures.

2. The Prior Art

Synthetic polyisoprene latex is chemically very similar to natural rubber latex. However, the physical properties of the 'vulcanized' films have never equaled those of the natural product. Natural latex films can be cured quickly (about 15 to 20 minutes) at low temperatures (about 90 to 100° C.) with a variety of accelerators to produce tensile strengths of about 4,000 psi to 5,000 psi (about 27 to 35 MPa). Polyisoprene latex films having high tensile strengths prior to the invention described herein, were very difficult to cure, primarily because no suitable accelerator system was available to promote the sulfur crosslinking. Regardless of the accelerator system selected for curing, only tensile strengths of about 500 psi to 2,000 psi (3 to 10 MPa) were achieved.

U.S. patent application Ser. No. 2002/0173563A1 describes a process for making dipped articles from latex involving the use of an accelerator system comprising zinc diethyldithiocarbamate ("ZDEC"), zinc 2-mercaptobenzothiazole ("ZMBT"), and diphenyl guanidine ("DPG"). ZDEC with the ZMBT is a popular accelerator system for natural rubber latex. Only the addition of DPG allows this accelerator system to achieve cured films with tensile strengths in excess of 3,000 psi (20 MPa).

U.S. Pat. No. 6,618,861 concerns a polyisoprene latex compound that includes an accelerator system of 2.0 parts per hundred ("phr") tetramethylthiuram disulfide ("TMTD"), 0.2 phr zinc 2-mercaptobenzothiazole ("ZMBT"), 0.2 phr zinc dibutyldithiocarbamate ("ZDBC"), 0.2 phr 1,3-diphenyl-2-thiourea and 0.2 phr zinc diethyldithiocarbamate ("ZDEC"). However, after curing, this accelerator system provides tensile strength only of about 1,900 psi.

Thiourea (thiocabanilide) and thiourea/guanidine accelerator systems are known for advancing the cures of polychloroprene latex compounds. Sodium dithiocarbamate/thiuram accelerators are also recommended for the same purpose. (J. Carl, *Neoprene Latex*, E. I. duPont deNemours & Co., Inc., 1962 and J. Fitch, *Polychloroprene Latexes*, The Vanderbilt Latex Handbook, Third Edition, R. T. Vanderbilt Company, Inc., 1987). However, these accelerator systems are recommended to advance the bisalkylation crosslinks of zinc chloride initiated by the metal oxides. They do not presume to significantly affect sulfur crosslinking as in polyisoprene latex where no allylic chlorine atoms are present.

SUMMARY OF THE INVENTION

The invention concerns an accelerator system (i.e., an accelerator composition) for synthetic polyisoprene latex that can produce films having a tensile strength of about 3,000 psi to about 5,000 psi (about 20.7 MPa to about 34.5 MPa) at low curing temperatures. The synthetic polyisoprene films have a low modulus and can be balanced for pot life or maturation (compound viscosity increases) and tensile strength. The accelerator system comprises:
1) dithiocarbamate, and
2) thiourea The invention also relates to synthetic polyisoprene latex compositions containing the accelerator system, and products prepared therefrom.

A method for curing the synthetic polyisoprene latex composition comprising the accelerator system is also within the scope of the invention. The method generally comprises the steps of forming a film from a composition comprising synthetic polyisoprene latex and an accelerator system having dithiocarbamate and thiourea and heating the film at low temperature (e.g. about 90° C. to about 140° C.) for up to about 30 minutes.

DETAILED DESCRIPTION OF THE INVENTION

Any dithiocarbamate may be used in the accelerator system, such as dithiocarbamates available from the R. T. Vanderbilt Company, Inc., Norwalk, Conn., USA ("Vanderbilt"). Examples of dithiocarbamates useful in the invention are sodium dithiocarbamate or zinc dithiocarbamate, particularly, from Vanderbilt, zinc dibutyldithiocarbamate ("ZDBC", available under the trade name BUTYL ZIMATE®), zinc diethyldithiocarbamate ("ZDEC", available under the trade name ETHYL ZIMATE®) and zinc dibenzyldithiocarbamate ("ZBEC", available under the trade name BENZYL ZIMATE®).

Blends of dithiocarbamates and other materials may be used in the accelerator system. Non-limiting examples of such blends are the combination of the zinc dithiocarbamate with ZMBT (available from Vanderbilt under the trade name ZETAX®), and a blend of sodium dibutyldithiocarbamate ("NaDBC"), sodium mercaptobenzothiazole ("NaMBT") and 1,3 dibutylthiourea, which is referred to in this Specification as "WB-7".

Any thiourea may be used in the accelerator system, including but not limited to trimethyl, diethtyl, ethylene, diphenyl and the like. The thiourea may be dibutylthiourea, in particular 1,3-dibutylthiourea, available under the trade name THIATE® U from Vanderbilt.

The accelerator system used in a synthetic polyisoprene latex composition achieves a surprising improvement over the art, since synthetic polyisoprene films having higher tensile strengths (e.g., about 3,000 psi to about 5,000 psi) can be obtained, without the necessity for a thiuram or a guanidine, such as TMTD and DPG. In particular, by using dithiocarbamates at amounts greater than about 0.2 phr, and up to about 4.0 phr, including about 0.5 phr to about 1.5 phr; and thiourea, at amounts greater than 0.2 phr and up to about 4.0 phr, including about 0.5 phr to about 1.5 phr, a much stronger latex product, having a higher tensile strength, can be achieved, without the necessity of a further additive such as TMTD and/or DPG. The tensile strengths for synthetic polyisoprene films that can be achieved with the accelerator system of the invention are similar to that which can be obtained with the use of conventional accelerator systems in natural rubber.

The accelerator composition may also comprise a thiazole, such as ZMBT, sodium 2-mercaptobenzothiazole or combinations thereof. Use of the thiazole, however, is optional. ZMBT, when used in an accelerator system with a thiourea, but without the dithiocarbamate, results in a film having an unacceptable low tensile strength of less than 2,000 psi.

Very low modulus compounds, such as are required for latex gloves, can be obtained with the accelerator system of the invention. For example, latex gloves with 300% modulus ranges of between about 190 psi to about 230 psi (about 1.3 MPa to about 1.6 MPa can be made). A latex compound that increases in viscosity upon standing is said to precure. The assumption is that vulcanization takes place in the colloidal state. Therefore, products manufactured with precured or matured compound tend to achieve higher physical properties and/or a faster cure rate than compounds that are processed shortly after they are mixed. This can be advantageous or disadvantageous depending on the variables of the manufacturing process. Latex compounds that continue to precure to a point where the increasing viscosity renders them unusable are said to have exceeded their pot life. The accelerator systems of the invention allow for optimizing the precure or maturation rate by selecting the type(s) and amount(s) of dithiocarbamate used with the thiourea. For instance, a polyisoprene latex compound accelerated by a combination of ZBEC with a thiourea will have a long pot life. The viscosity will not increase substantially upon standing for two or more weeks. The same is true when an accelerator system of ZDEC and ZMBT is used with a thiourea. Polyisoprene latex films having an accelerator system containing ZDBC with a thiourea cure to very high physical properties, but their colloidal compounds tend toward diminished pot life. However, by decreasing the amount of the ZDBC, very satisfactory pot lives can be achieved.

The accelerator system can be used to satisfactorily cure polyisoprene latex compounds with the dithiocarbamate/thiourea accelerator combinations at oven temperatures as low as about 100° C. The curing temperature may be around 90° C. to about 140° C., such as about 100° C. to about 120° C. Generally, the curing times will vary with oven temperature and the curing times may be up to about 30 minutes long, however, acceptable synthetic polyisoprene films can be obtained by curing at the relatively low temperatures of about 100° C. to about 120° C. for about 18 minutes to about 30 minutes. At higher temperatures (such as about 130° C. to about 140° C.); satisfactory cures can be obtained in up to about 10 minutes, preferably up to about 6 minutes.

In an embodiment of the invention, the accelerator system comprises:
1) dithiocarbamate, a blend of dithiocarbamates or dithiocarbamate in combination with thiazole, at greater than 0.2 phr to about 4.0 phr (preferably about 0.5 phr to about 1.5 phr); and
2) thiourea at greater than 0.2 phr to about 4.0 phr (preferably about 0.5 phr to about 1.5 phr).

The accelerator composition of the invention may also consist essentially of dithiocarbamate, a blend of dithiocarbamates or dithiocarbamate in combination with thiazole, and thiourea. The invention further relates to a latex composition including an accelerator system as described above, which latex composition is free of TMTD and/or DPG.

EXAMPLES

Synthetic polyisoprene latex having the composition set forth in Table 1 was formulated by methods known in the art. All components set forth in Table 1 are reported as parts per hundred (phr). Different accelerator systems, which are identified in Table 2 were added and the latex compositions were cured at different conditions as set forth in Table 2. The curing conditions were 30 minutes at 100° C., 18 minutes at 120° C. and 6 minutes at 140° C.

The amount of each component of the accelerator system is set forth in parts per hundred. Thiourea and dithiocarbamate levels were varied from 0.33 phr to 1.0 phr. ZDEC/ZMBT was used at a level of 0.5 phr each as was the WB-7 that contained a similar ratio of NaDBC/NaMBT. The compounds and results in the tables illustrate the nature of the acceleration properties of the accelerator systems. Levels of 0.1 to about 4.0 phr of the individual accelerator components in combinations with each other can give satisfactory results.

Examples 1A and 1B

Satisfactory tensile strength results were obtained whether the dithiocarbamate/thiazole salts are zinc as in the ZDEC/ZMBT blend or sodium as in WB-7. Also, the different cure time/temperature conditions produced films with satisfactory physical properties. All viscosities are satisfactorily low, as well.

Examples 2A and 2B

At lower cure temperatures, the ZDBC/thiourea combination produced films with much higher tensile strength than the ZBEC/thiourea combination but there was little difference at the higher cure temperature. However, the viscosity of the ZDBC/thiourea combination increased significantly upon standing for two weeks whereas the ZBEC/thiourea combination did not.

Examples 3A and 3B

Example 3A is colloidally stable with a 350 cps viscosity after standing almost a week and produces films with very high tensile strength. These films can be satisfactorily vulcanized at all three of the time/temperature conditions. Also, the 300% modulus is 230 psi or less in each case, which is a very important consideration for the latex glove industry.

Example 3B illustrates the effect of decreasing the dosage of the accelerator system. In Example 3B, the total amount of accelerator is ½ the amount in Example 3A, (1 phr vs. 2 phr). Viscosities are lower so the compound is more stable. Tensile strengths are satisfactory.

TABLE 1

| | Dry phr | Supplier |
|---|---|---|
| 64% IR 401 Polyisoprene Latex | 100 | Kraton ® Polymers, Inc. |
| 33% Darvan ® WAQ | 0.25 | R. T. Vanderbilt |
| 33% Zinc Oxide | 0.5 | various |
| 50% Sulfur | 1.5 | various |

TABLE 1-continued

| | Dry phr | Supplier |
|---|---|---|
| 50% VANOX ® SPL | 2 | R. T. Vanderbilt |
| 33% DARVAN SMO | 0.5 | R. T. Vanderbilt |
| Accelerators | As noted below in Table 2 | |

Notes:
KRATON ® is a registered trademark of the KRATON ® Polymers Group of Companies having offices in Houston, Texas, USA.
DARVAN ® and VANOX ® are registered trademarks of Vanderbilt.

TABLE 2

| Compound Number | Example 1A | Example 1B | Example 2A | Example 2B | Example 3A | Example 3B |
|---|---|---|---|---|---|---|
| ZDEC/ZMBT | 1 | | | | | |
| ZDBC | | | 1 | | 0.67 | 0.33 |
| ZEBC | | | | 1 | 0.67 | 0.33 |
| WB-7 | | 2 | | | | |
| 1,3 dibutylthiourea | 1 | | 1 | 1 | 0.67 | 0.33 |
| Viscosity, cps | | | | | | |
| after mix | | 250 | 250 | 250 | | |
| after 1 day | | | | | 300 | 275 |
| after 2 days | | | | | 350 | 275 |
| after 3 days | | 275 | 400 | 300 | | |
| after 6 days | | | | | 350 | 287.5 |
| after 1 week | | | | | | |
| after 2 weeks | | 300 | 2000 | 275 | | |
| after 3 weeks | | | | | | |
| after 4 weeks | 250–350 (est) | | | | | |
| Cure @ 100° C. for 30 minutes | | | | | | |
| Tensile Strength, psi | | 4020 | 4760 | 2830 | 5120 | 2800 |
| 300% Modulus, psi | | | | | 230 | 170 |
| Elongation, % | | 830 | 900 | 840 | 860 | 1000 |
| Cure @ 120° C. for 18 minutes | | | | | | |
| Tensile Strength, psi | 3890 | 5050 | 4500 | 2780 | 4420 | 3950 |
| 300% Modulus, psi | | | | | 220 | 190 |
| Elongation, % | 1000 | 940 | 870 | 810 | 890 | 930 |
| Cure @ 140° C. for 6 minutes | | | | | | |
| Tensile Strength, psi | 4610 | 3890 | 4910 | 4510 | 4560 | 2990 |
| 300% Modulus, psi | | | | | 210 | 200 |
| Elongation, % | 960 | 980 | 880 | 850 | 910 | 820 |

What is claimed is:

1. A composition comprising synthetic polyisoprene latex and an accelerator system having about 0.5 phr to about 4.0 phr dithiocarbamate and greater than 0.2 phr to about 4.0 phr thiourea wherein the composition does not contain tetramethyithiuram disulfide or diphenylguanidine and a polyisoprene film formed from heating and curing the composition has a tensile strength of about 3,000 psi to about 5,000 psi.

2. The composition of claim 1 wherein the amount of dithiocarbamate is from about 0.5 phr to about 1.5 phr.

3. The composition of claim 1 wherein the dithiocarbamate is selected from the group consisting of sodium dithiocarbamate, zinc dithiocarbamate and combinations thereof.

4. The composition of claim 3 wherein the zinc dithiocarbamate is selected from the group consisting of zinc dibutyldithiocarbamate, zinc diethyldithiocarbamate, zinc dibenzyldithiocarbamate and combinations thereof.

5. The composition of claim 1 further comprising thiazole.

6. The composition of claim 5 wherein the thiazole is selected from the group consisting of zinc 2-mercaptobenzothiazole, sodium 2-mercaptobenzothiazole, or combinations thereof.

7. The composition of claim 1 wherein the thiourea is 1,3 dibutyl thiourea.

8. The composition of claim 1 wherein the amount of thiourea is about 0.5 phr to about 4 phr.

9. The composition of claim 1 wherein the amount of thiourea is about 0.5 phr to about 1.5 phr.

10. A method for curing synthetic polyisoprene latex comprising the steps of forming a film from a composition comprising synthetic polyisoprene latex and an accelerator system having about 0.5 phr to about 4.0 phr dithiocarbamate and greater than 0.2 phr to about 4.0 phr thiourea wherein the accelerator system does not contain tetramethyithiuram disulfide or diphenylguanidine and heating the film at a temperature of about 90° C. to about 140° C. for up to about 30 minutes wherein the synthetic polyisoprene latex cured film has a tensile strength of about 3,000 psi to about 5,000 psi.

11. The method of claim 10 wherein the dithiocarbamate is selected from the group consisting of sodium dithiocarbamate, zinc dithiocarbamate and combinations thereof.

12. The method of claim 11 wherein the zinc diothiocarbamate is selected from the group consisting of zinc dibutyldithiocarbamate, zinc diethyldithiocarbamate, zinc dibenzyldithiocarbamate and combinations thereof.

13. The method of claim 10 wherein the accelerator system further comprises thiazole.

14. A latex glove comprising synthetic polyisoprene latex cured in accordance with the method of claim 10.

15. The method of claim 10 wherein the amount of dithiocarbamate is about 0.5 phr to about 1.5 phr.

16. The method of claim 10 wherein the amount of thiourea is about 0.5 phr to about 4 phr.

17. The method of claim 16 wherein the amount of thiourea is about 0.5 phr to about 1.5 phr.

18. A method for curing synthetic polyisoprene latex comprising the steps of forming a film from a composition comprising synthetic polyisoprene latex and an accelerator system having dithiocarbamate and 1,3 dibutyl thiourea wherein the accelerator system does not contain tetramethyithiuram disulfide or diphenylguanidine and heating the film at a temperature of about 90° C. to about 140° C. for up to about 30 minutes wherein the synthetic polyisoprene latex cured film has a tensile strength of about 3,000 psi to about 5,000 psi.

* * * * *